United States Patent
Ito et al.

(10) Patent No.: US 8,509,294 B2
(45) Date of Patent: Aug. 13, 2013

(54) SIGNAL GENERATOR, SIGNAL GENERATING SYSTEM, AND SIGNAL GENERATING METHOD

(75) Inventors: Shinichi Ito, Atsugi (JP); Tatsuro Hanaya, Atsugi (JP); Jun Ono, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 21 days.

(21) Appl. No.: 13/307,109

(22) Filed: Nov. 30, 2011

(65) Prior Publication Data
US 2012/0300825 A1 Nov. 29, 2012

(30) Foreign Application Priority Data
Dec. 16, 2010 (JP) ................. 2010-280082

(51) Int. Cl.
*H04B 3/46* (2006.01)
*H04B 17/00* (2006.01)
*H04Q 1/20* (2006.01)
*G01R 29/027* (2006.01)

(52) U.S. Cl.
USPC ............. 375/226; 375/224; 702/72; 702/71; 702/66; 702/57; 702/1

(58) Field of Classification Search
USPC .......................... 375/226; 702/72
See application file for complete search history.

(56) References Cited

U.S. PATENT DOCUMENTS

| 5,469,166 | A | * | 11/1995 | Regev | ............... 342/14 |
| 8,060,327 | B2 | | 11/2011 | Kurosawa | |
| 2009/0204357 | A1 | * | 8/2009 | Kurosawa | ............ 702/124 |
| 2012/0088992 | A1 | * | 4/2012 | Armitstead | ............ 600/323 |

FOREIGN PATENT DOCUMENTS

| JP | 2000-292445 A | 10/2000 |
| JP | 2002044170 A | 2/2002 |
| JP | 2009-030983 A | 2/2009 |

OTHER PUBLICATIONS

Wong, Wireless Internet Telecommunications, Artech House, 2005, p. 191.*

* cited by examiner

*Primary Examiner* — Shuwang Liu
*Assistant Examiner* — Michelle M Koeth
(74) *Attorney, Agent, or Firm* — Pearne & Gordon LLP

(57) ABSTRACT

To provide a signal generator, a signal generating system, and a signal generating method capable of repeatedly generating an arbitrary waveform and making the phases of the head and tail of the generated waveform continuous with each other, without changing the frequency of the waveform.
A signal generator (10, 11, 12) includes phase shift means (30) that receives waveform data which is repeatedly output n times, shifts the phase of each sample data item in an n-th waveform data item by a phase shift amount $\phi_n$ corresponding to the number of times n the waveform data is repeatedly output, and outputs the waveform data to D/A conversion means.

13 Claims, 13 Drawing Sheets

SIGNAL GENERATOR, SIGNAL GENERATING SYSTEM, AND SIGNAL GENERATING METHOD

TECHNICAL FIELD

The present invention relates to a signal generator, a signal generating system, and a signal generating method for outputting an RF test signal to a wireless communication device, which is a test target, to test the wireless communication device.

BACKGROUND ART

Signal generators have been known which transmit a test signal of a communication scheme corresponding to a wireless communication device to the wireless communication device in order to test the wireless communication device. For example, there is a signal generator which stores a baseband signal corresponding to the test signal as digital waveform data in a memory unit thereof, repeatedly outputs the stored waveform data, performs D/A conversion on the waveform data, performs frequency conversion on the converted signal, and outputs the frequency-converted signal as an RF test signal.

In the signal generator, since the capacity of the memory unit is limited, the length of the waveform data is finite. In some cases, it is difficult to freely change the length of the waveform data, for example, since the test conditions for the wireless communication device are defined by a standard. Therefore, in the signal generator according to the related art, a phenomenon in which the phase is discontinuous in a connection portion between the head and tail of the waveform data which is repeatedly output occurs. In this case, there is a concern that spurious emissions will occur at the point where the phase is discontinuous and wireless communication will be asynchronous, which makes it difficult to normally test the wireless communication device.

FIG. 13 is a conceptual diagram illustrating the phenomenon. FIG. 13 shows a waveform when waveform data W including M sample data items $D_1$ to $D_M$ is repeatedly output three times and is D/A-converted. Since there is a large difference between the phase of the first sample data item $D_1$ and the phase of the last sample data item $D_M$ in the waveform data W, the phase of the D/A-converted waveform is discontinuous in a connection portion between the first repeated waveform data and the second repeated waveform data and a connection portion between the second repeated waveform data and the third repeated waveform data.

In order to solve the problems, an arbitrary waveform signal generating device has been proposed which generates an FSK (Frequency Shift Keying) signal with a waveform pattern in which the phase is continuous in the connection portion (for example, see Patent Document 1). The arbitrary waveform signal generating device includes a digital data generator that repeatedly outputs a PN (Pseudo-Noise) signal and correction means that separately adds a correction value to each bit of the output data of the digital data generator, and can generate an FSK signal in which the phase is continuous in the connection portion.

RELATED ART DOCUMENT

Patent Document

[Patent Document 1] JP-A-2002-44170

DISCLOSURE OF THE INVENTION

Problem that the Invention is to Solve

However, the technique disclosed in Patent Document 1 has a problem in that, since data is corrected such that the phase is continuous in the connection portion, the frequency of the output signal is changed and it is difficult to accurately test the wireless communication device.

The invention has been made in view of the above-mentioned problems and an object of the invention is to provide a signal generator, a signal generating system, and a signal generating method capable of repeatedly generating an arbitrary waveform such that the phase of the tail of the generated waveform and the phase of the head of the next waveform which is repeatedly generated are continuous with each other, without changing the frequency of the waveform, in order to accurately test a wireless communication device.

Means for Solving Problem

In order to achieve the object, according to an aspect of the invention, a signal generator (10, 11, 12) includes: waveform data storage means (20) for storing waveform data of a digital baseband signal including M sample data items and repeatedly and continuously outputting the waveform data; D/A conversion means (40) for performing digital-analog conversion on the waveform data; frequency conversion means (60, 70) for performing frequency conversion on the digital-analog-converted baseband signal using a carrier signal with a predetermined frequency and outputting the frequency-converted signal as an RF test signal for testing a wireless communication device; and phase shift means (30) that receives the waveform data which is repeatedly output n times from the waveform data storage means, shifts the phase of each sample data item in an n-th waveform data item by a phase shift amount $\phi_n$ corresponding to the number of times n the waveform data is repeatedly output, and outputs the waveform data to the D/A conversion means. The phase shift amount $\phi_n$ is calculated from a reference phase difference $\theta$, which is a phase difference between an (n−1)-th waveform data item and the n-th waveform data item, and the number of times n the waveform data is repeatedly output in order to obtain a continuous phase change between the tail of the (n−1)-th waveform data item and the head of the n-th waveform data item.

The signal generator according to the above-mentioned aspect of the invention may further include reference phase difference determining means (23) for determining the reference phase difference $\theta$ on the basis of the waveform data stored in the waveform data storage means.

In the signal generator according to the above-mentioned aspect of the invention, the reference phase difference determining means may include: phase estimating means (82) for estimating the phase of an (M+1)-th sample data item on the basis of the phase of an M-th sample data item and the phase of an (M−1)-th sample data item from the head of the waveform data; and reference phase difference calculating means (83) for calculating the reference phase difference $\theta$ from a difference between the phase of a first sample data item and the phase of the (M+1)-th sample data item in the waveform data.

In the signal generator according to the above-mentioned aspect of the invention, the reference phase difference determining means may include: average phase difference calculating means (81) for calculating an average phase difference per sample data item of the waveform data; phase estimating means (82) for estimating the phase of an (M+1)-th sample data item on the basis of the phase of an M-th sample data item from the head of the waveform data and the average phase difference; and reference phase difference calculating means (83) for calculating the reference phase difference $\theta$ from a difference between the phase of a first sample data item and the phase of the (M+1)-th sample data item in the waveform data.

According to another aspect of the invention, a signal generating system includes the above-mentioned signal generator; and a waveform data generating device (90) that generates the waveform data and transmits the waveform data to the signal generator. The waveform data generating device includes: waveform data generating means (92) for generating the waveform data; reference phase difference determining means (93) for determining the reference phase difference $\theta$; and waveform data transmitting means (94) for transmitting the waveform data and the reference phase difference $\theta$ to the signal generator.

In the signal generating system according to the above-mentioned aspect of the invention, the reference phase difference determining means may include: phase estimating means (82) for estimating the phase of an (M+1)-th sample data item on the basis of the phase of an M-th sample data item and the phase of an (M−1)-th sample data item from the head of the waveform data; and reference phase difference calculating means (83) for calculating the reference phase difference $\theta$ from a difference between the phase of a first sample data item and the phase of the (M+1)-th sample data item in the waveform data.

In the signal generating system according to the above-mentioned aspect of the invention, the reference phase difference determining means may include: average phase difference calculating means (81) for calculating an average phase difference per sample data item of the waveform data; phase estimating means (82) for estimating the phase of an (M+1)-th sample data item on the basis of the phase of an M-th sample data item from the head of the waveform data and the average phase difference; and reference phase difference calculating means (83) for calculating the reference phase difference $\theta$ from a difference between the phase of a first sample data item and the phase of the (M+1)-th sample data item in the waveform data.

In the signal generating system according to the above-mentioned aspect of the invention, the waveform data generating means may generate first to M-th sample data items, acquire the phase of an (M+1)-th sample data item, and generate the waveform data using the generated M sample data items. The reference phase difference determining means may include reference phase difference calculating means (83) for calculating the reference phase difference $\theta$ from a difference between the phase of the first sample data and the phase of the (M+1)-th sample data item in the waveform data.

According to still another aspect of the invention, a signal generating method includes: a step (S9) of repeatedly and continuously outputting waveform data of a digital baseband signal including M sample data items; a step (S11) of performing digital-analog conversion on the waveform data; a step (S12) of performing frequency conversion on the digital-analog-converted baseband signal using a carrier signal with a predetermined frequency and outputting the frequency-converted signal as an RF test signal for testing a wireless communication device; a step (S7) of, when the number of times the waveform data is repeatedly output is n, calculating a phase shift amount $\phi_n$ corresponding to the number of times n the waveform data is repeatedly output; and a step (S10) of shifting the phase of each sample data item in an n-th waveform data item by the phase shift amount $\phi_n$ when the waveform data which is repeatedly output n times is received before the digital-analog conversion step. The phase shift amount $\phi_n$ is calculated from a reference phase difference $\theta$, which is a phase difference between an (n−1)-th waveform data item and the n-th waveform data item, and the number of times n the waveform data is repeatedly output in order to obtain a continuous phase change between the tail of the (n−1)-th waveform data item and the head of the n-th waveform data item.

The signal generating method according to the above-mentioned aspect may further include a step (S3) of determining the reference phase difference $\theta$ on the basis of the waveform data.

In the signal generating method according to the above-mentioned aspect of the invention, the step of determining the reference phase difference $\theta$ may include: a step (S23) of estimating the phase of an (M+1)-th sample data item on the basis of the phase of an M-th sample data item and the phase of an (M−1)-th sample data item from the head of the waveform data; and a step (S24) of calculating the reference phase difference $\theta$ from a difference between the phase of a first sample data item and the phase of the (M+1)-th sample data item in the waveform data.

In the signal generating method according to the above-mentioned aspect of the invention, the step of determining the reference phase difference $\theta$ may include: a step (S32) of calculating an average phase difference per sample data item of the waveform data; a step (S34) of estimating the phase of an (M+1)-th sample data item on the basis of the phase of an M-th sample data item from the head of the waveform data and the average phase difference; and a step (S35) of calculating the reference phase difference $\theta$ from a difference between the phase of a first sample data item and the phase of the (M+1)-th sample data item in the waveform data.

The signal generating method according to the above-mentioned aspect may further include: a step (S41) of generating first to M-th sample data items and acquiring the phase of (M+1)-th sample data; a step (S42) of generating the waveform data using the generated M sample data items; and a step (S44) of calculating the reference phase difference $\theta$ from a difference between the phase of the first sample data item and the phase of the (M+1)-th sample data item in the waveform data.

Advantage of the Invention

The signal generator, the signal generating system, and the signal generating method according to the invention are capable of repeatedly generating an arbitrary waveform such that the phase of the tail of the generated waveform and the phase of the head of the next waveform which is repeatedly generated are continuous with each other, without changing the frequency of the waveform.

BEST MODE FOR CARRYING OUT THE INVENTION

Figure 1:
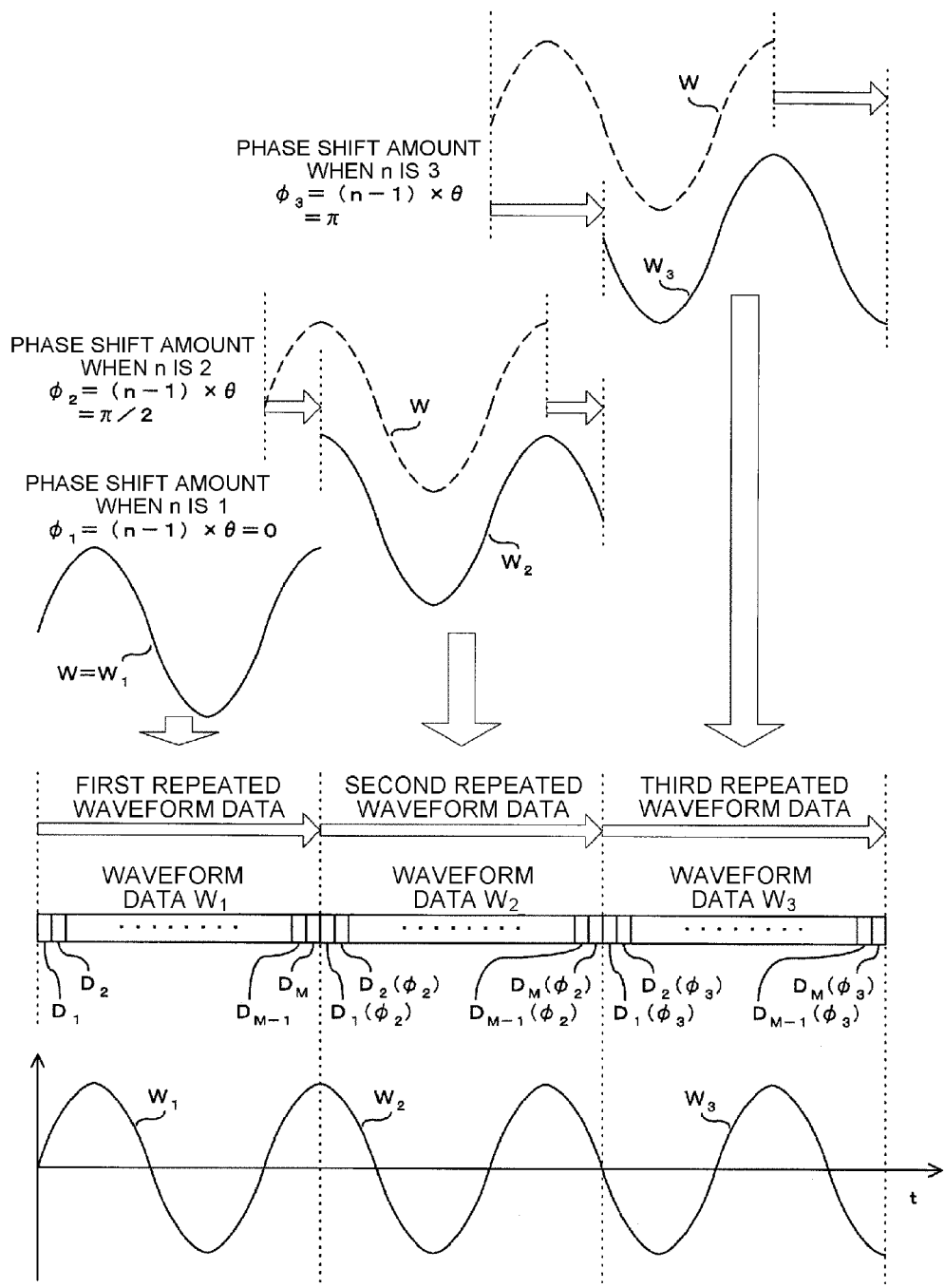
FIG. 1 is a conceptual diagram of the invention.

First, the concept of the invention will be described with reference to FIG. 1. FIG. 1 shows a waveform when waveform data W including M sample data items $D_1$ to $D_M$ is repeatedly output three times and is D/A-converted. When the first repeated waveform data W is $W_1$, the second repeated waveform data W is $W_2$, and the third repeated waveform data W is $W_3$, the phase of each of the sample data items $D_1$ to $D_M$ in the waveform data W is shifted by a phase shift amount $\phi_n$ corresponding to the number of times n the waveform data is repeated. The phase shift amount $\phi_n$ is determined such that the phase is continuous at the tail of the waveform data $W_1$ and the head of the waveform data $W_2$ and at the tail of the waveform data $W_2$ and the head of the waveform data $W_3$. In this way, the waveform data W which is repeated three times becomes the waveform data items $W_1$, $W_2$, and $W_3$ with a continuous phase.

Specifically, in the first repeated waveform data W, the phase of each of the sample data items $D_1$ to $D_M$ is shifted (delayed) by $\phi_1$. In this example, since $\phi_1=0$ is established, the phase is not actually shifted and the waveform data W is $W_1$. In the second repeated waveform data W, the phase of each of the sample data items $D_1$ to $D_M$ is shifted by $\phi_2$ and the waveform data $W_2$ including sample data items $D_1(\phi_2)$ to $D_M(\phi_2)$ is obtained. In this example, $\phi_2$ is $\pi/2$. In the third repeated waveform data W, the phase of each of the sample data items $D_1$ to $D_M$ is shifted by $\phi_3$ and the waveform data $W_3$ including sample data items $D_1(\phi_3)$ to $D_M(\phi_3)$ is obtained. In this example, $\phi_3$ is $\pi$.

The phase shift amount $\phi_n=(n-1)\times\theta$ is calculated from the number of times n the waveform data is repeated and a reference phase difference $\theta$. The reference phase difference $\theta$ is the phase difference between the previous waveform data and the next waveform data when a phase change is continuous at the tail (the last sample data) of the previously output waveform data and the head (first sample data) of the next waveform data which is repeatedly output. Specifically, the reference phase difference $\theta$ is the phase difference in which the phase of the last sample data $D_M$ in the first repeated waveform data $W_1$ and the phase of the first sample data $D_1(\phi_2)$ in the second repeated waveform data $W_2$ are continuously changed. In this example, $\theta$ is $\pi/2$. A method of determining the reference phase difference $\theta$ will be described in detail below.

As such, in the invention, the reference phase difference $\theta$ is determined, the phase shift amount $\phi_n$ is calculated from the number of times n the waveform data is repeated and the reference phase difference $\theta$, and the phase of each of the sample data items $D_1$ to $D_M$ in the waveform data W is shifted by the phase shift amount $\phi_n$ corresponding to the number of times n the waveform data is repeated. In this way, it is possible to repeatedly generate an arbitrary waveform by continuously connecting the tail of a generated waveform and the head of the next waveform which is repeatedly generated, without changing the frequency of the waveform and generating spurious emissions.

First Embodiment

Figure 2:
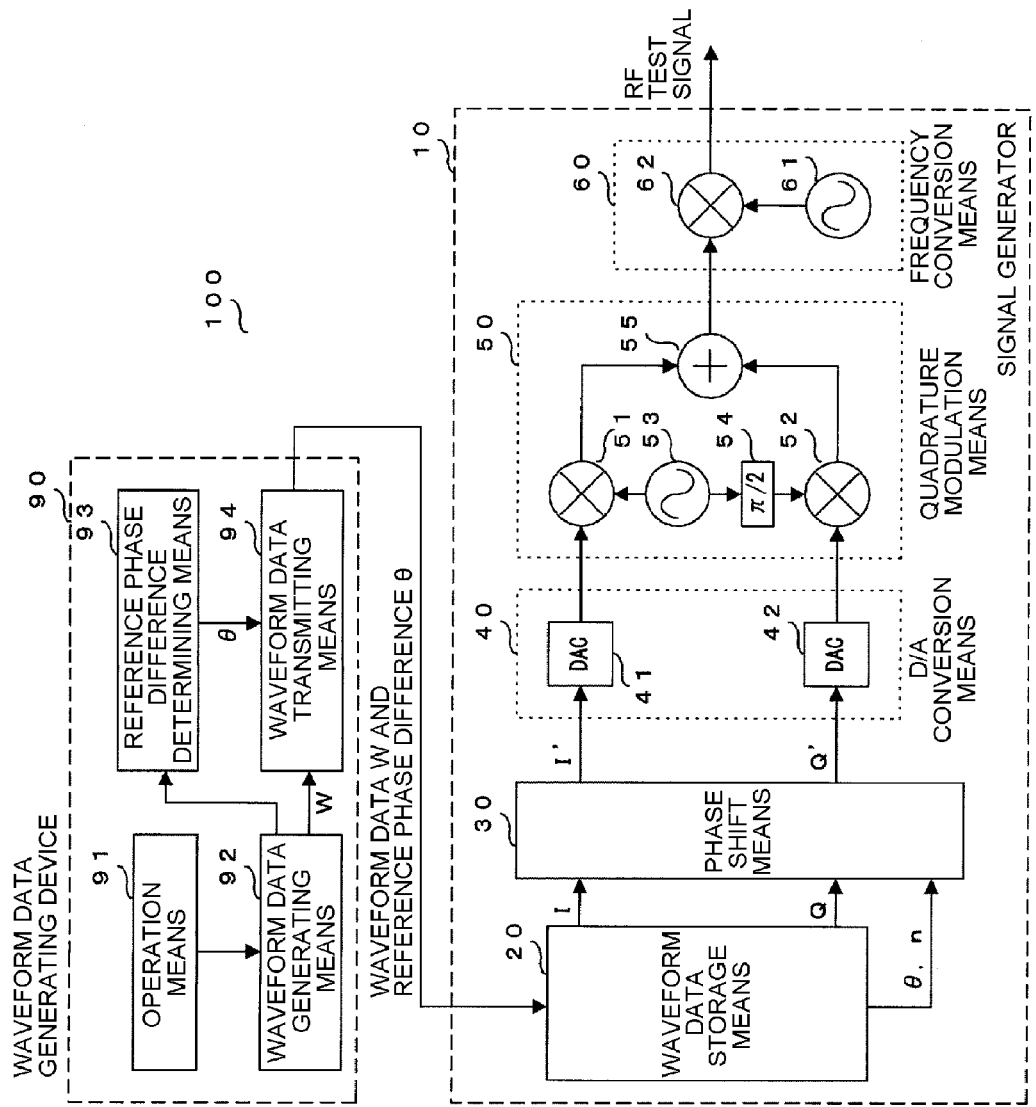
FIG. 2 is a block diagram illustrating a first embodiment of the invention.

FIG. 2 shows the structure of a signal generating system 100 according to the invention. The signal generating system 100 includes a waveform data generating device 90 that generates the waveform data W and determines the reference phase difference $\theta$ and a signal generator 10 that generates an RF test signal from the waveform data W and the reference phase difference $\theta$. For example, the waveform data W is of an FSK-modulated signal and the signal generator 10 generates the RF test signal for testing a wireless communication device corresponding to a communication system using an FSK modulation method. The communication system using the FSK modulation method is, for example, Bluetooth (registered trademark).

The waveform data generating device 90 includes operation means 91, waveform data generating means 92, reference phase difference determining means 93, and waveform data transmitting means 94. The waveform data generating device 90 includes, for example, a personal computer and software, and implements the functions of the means.

The operation means 91 is operated by the user to set parameters for generating waveform data. For example, the operation means 91 includes a display (not shown) that displays a setting screen for setting the parameters and an input device, such as a keyboard or a mouse.

The waveform data generating means 92 generates the digital waveform data W on the basis of the parameters input by the user through the operation means 91. The waveform data W is of a baseband signal and includes M sample data items $D_1$ to $D_M$. More accurately, the waveform data W is complex IQ data and includes M I-phase data items (each of which is, for example, 16-bit data) and M Q-phase data items (each of which is, for example, 16-bit data). Therefore, there are M sets of IQ data items. However, in this embodiment, one set of IQ data items is described as one sample data item. The waveform data generating means 92 transmits information related to the waveform data W to the reference phase difference determining means 93 and transmits the waveform data W to the waveform data transmitting means 94.

The reference phase difference determining means 93 determines the reference phase difference $\theta$ on the basis of the information related to the waveform data W received from the waveform data generating means 92. The detailed structure of the reference phase difference determining means 93 will be described below.

The waveform data transmitting means 94 transmits the waveform data W received from the waveform data generating means 92 and the reference phase difference θ received from the reference phase difference determining means 93 to the signal generator 10. In order to transmit the waveform data to the signal generator 10, the waveform data generating device 90 and the signal generator 10 may be connected to each other by USB, Ethernet (registered trademark), or a wireless LAN, or through a storage medium, such as a CD or an SD card.

The signal generator 10 includes waveform data storage means 20, phase shift means 30, D/A conversion means 40, quadrature modulation means 50, and frequency conversion means 60. The signal generator 10 generates the RF test signal for testing a wireless communication device on the basis of the waveform data W.

The waveform data storage means 20 stores the waveform data W and the reference phase difference θ received from the waveform data generating device 90 and repeatedly outputs the I-phase data and the Q-phase data of the waveform data W. In addition, the waveform data storage means 20 outputs the reference phase difference θ corresponding to the output waveform data W and the number of times n the waveform data W is repeatedly output. Specifically, the waveform data storage means 20 includes a high-capacity storage unit, such as a hard disk drive (HDD), and a random access memory (RAM) which can read or write data at a high speed, and can store combinations of plural kinds of waveform data W and reference phase difference θ in the storage unit. The waveform data storage means 20 moves the waveform data W designated by the user to the memory unit and outputs the waveform data W from the memory unit. Therefore, the capacity of the waveform data W does not exceed the storage capacity of the memory unit.

Figure 3:
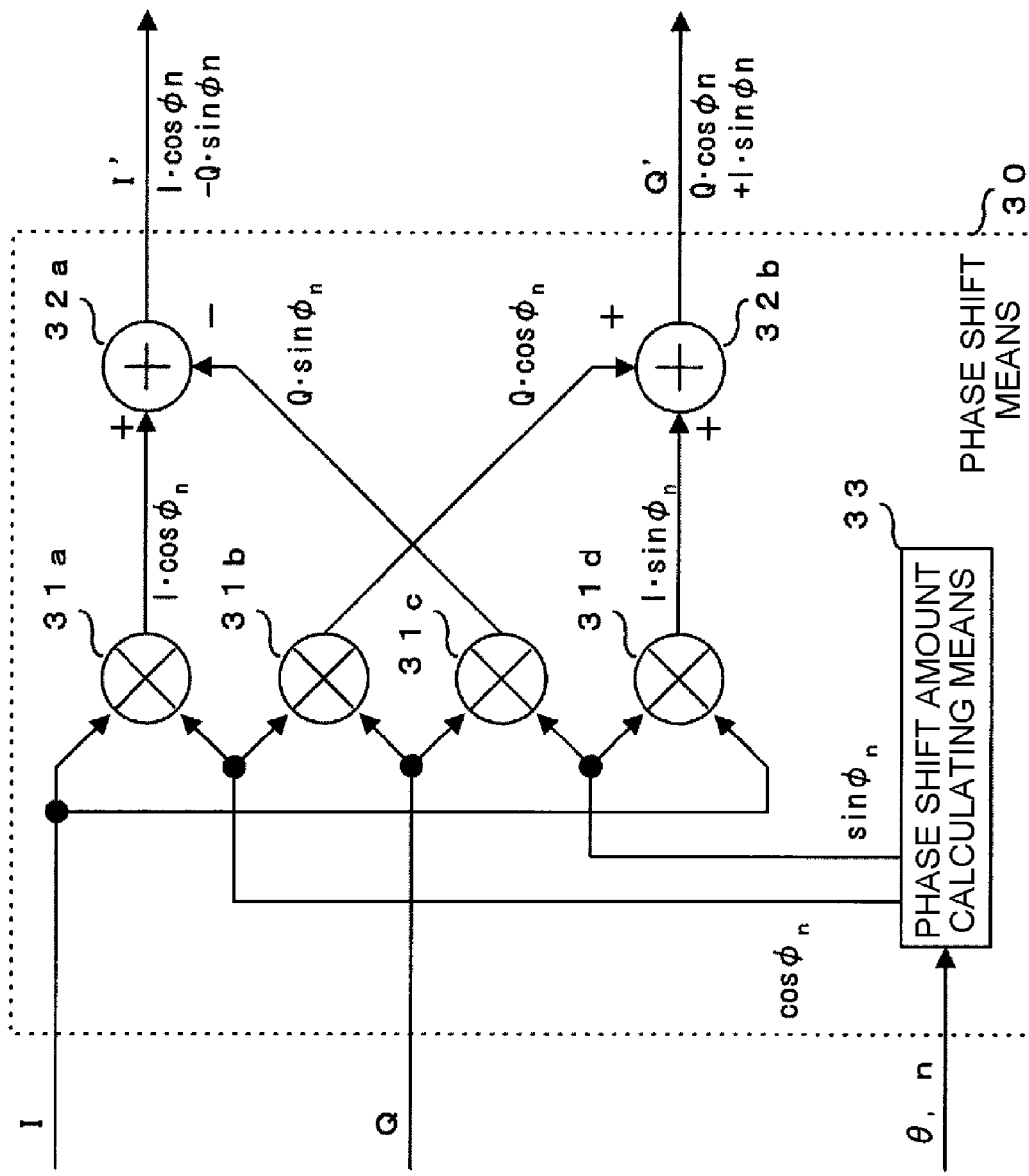
FIG. 3 is a block diagram illustrating a main portion of the first embodiment of the invention.

The phase shift means 30 calculates the phase shift amount $\phi_n$ on the basis of the reference phase difference θ and the number of times n the waveform data is repeatedly output which are received from the waveform data storage means 20 and shifts the phases of the I-phase data and the Q-phase data of the waveform data W by the calculated phase shift amount. FIG. 3 shows the structure of the phase shift means 30. The phase shift means 30 includes digital multipliers 31a to 31d, digital adders 32a and 32b, and phase shift amount calculating means 33. The phase shift amount calculating means 33 receives the reference phase difference θ and the number of times n the waveform data W is repeatedly output from the waveform data storage means 20, calculates the phase shift amount $\phi_n=(n-1)\times\theta$, and outputs phase shift data items $\cos\phi_n$ and $\sin\phi_n$ corresponding to the calculated phase shift amount. The multipliers 31a to 31d multiply each IQ data item of each sample data item in the waveform data W by phase shift data, and the adders 32a and 32b add (or subtract) the outputs of the multipliers and output IQ data items I' and Q' obtained by shifting the phase of each sample data item. Specifically, each sample data item of the waveform data W is represented by $Ae^{j\phi}=A(\cos\phi+j\sin\phi)$, the I-phase data is $A\cos\phi$, and the Q-phase data is $A\sin\phi$. The phase shift data is $e^{j\phi_n}$ and the phase shift data $e^{j\phi_n}$ is multiplied by each sample data item to shift the phase of each sample data item by the phase shift amount $\phi_n$. This expression is expanded as follows.

$$Ae^{j\phi} \cdot e^{j\phi_n} = A(\cos\phi + j\sin\phi)\cdot(\cos\phi_n + j\sin\phi_n)$$
$$= (A\cdot\cos\phi\cdot\cos\phi_n - A\cdot\sin\phi\cdot\sin\phi_n) +$$
$$j(A\cdot\sin\phi\cdot\cos\phi_n + A\cdot\cos\phi\cdot\sin\phi_n)$$
$$= (I\cdot\cos\phi_n - Q\cdot\sin\phi_n) + j(Q\cdot\cos\phi_n + I\cdot\sin\phi_n)$$
$$= I' + jQ'$$

(where I'=I·cos $\phi_n$−Q·sin $\phi_n$ and Q'=Q·cos $\phi_n$+I·sin $\phi_n$).

The phase shift means 30 shown in FIG. 3 performs calculation corresponding to this expression and outputs the phase-shifted IQ data items I' and Q'. The phase shift means 30 is implemented by an arithmetic process of an arithmetic circuit (FPGA or DSP) or a CPU.

The D/A conversion means 40 includes two D/A converters 41 and 42 and sequentially performs D/A conversion on the IQ data of each of the phase-shifted sample data items.

The quadrature modulation means 50 is a quadrature modulator including two mixers 51 and 52, a local oscillator 53, a 90-degree phase shifter 54, and an adder 55. The quadrature modulation means 50 mixes the D/A-converted I-phase signal with a local oscillation signal from the local oscillator 53 and mixes the D/A-converted Q-phase signal with a signal obtained by shifting the phase of the local oscillation signal from the local oscillator 53 by 90 degrees (π/2). Then, the quadrature modulation means 50 adds the mixed signals and outputs the addition result.

The frequency conversion means 60 includes a local oscillator 61 and a mixer 62 and performs frequency conversion on the signal from the quadrature modulation means 50 using the local oscillation signal from the local oscillator 61. The frequency-converted signal is shaped and amplified by a filter (not shown) and an amplifier (not shown) and is then output as the RF test signal.

Figure 4:
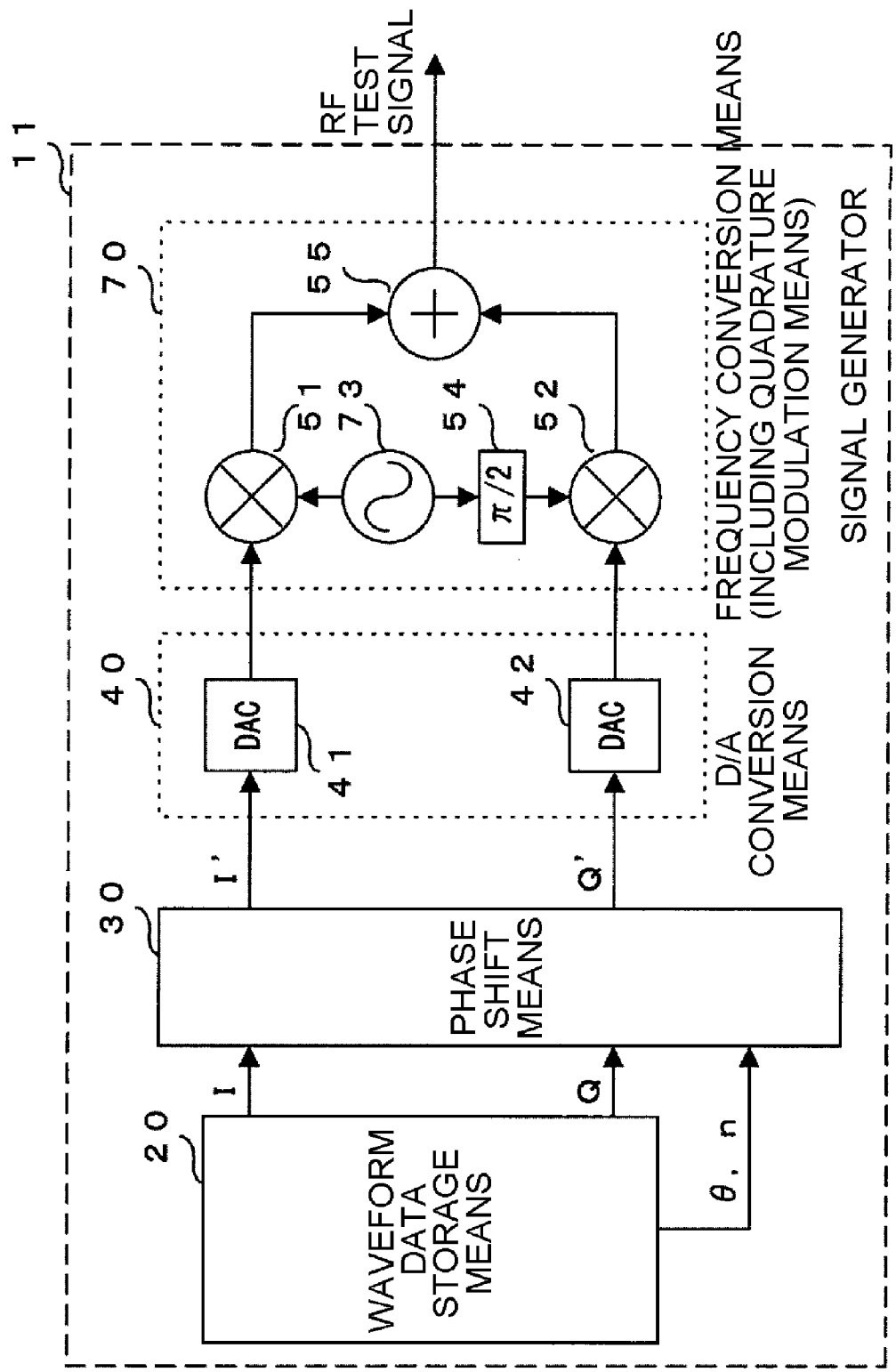
FIG. 4 is a diagram illustrating a modification of a signal generator according to the first embodiment.

The signal generator may have the same structure as the signal generator 11 shown in FIG. 4. In FIG. 4, the frequency conversion means 70 also has the functions of the quadrature modulation means 50 and the frequency conversion means 60 shown in FIG. 2, and the frequency of the local oscillation signal from the local oscillator 73 is used as the frequency of a carrier wave, which makes it possible to perform quadrature modulation and frequency conversion using the same means.

Figure 5:
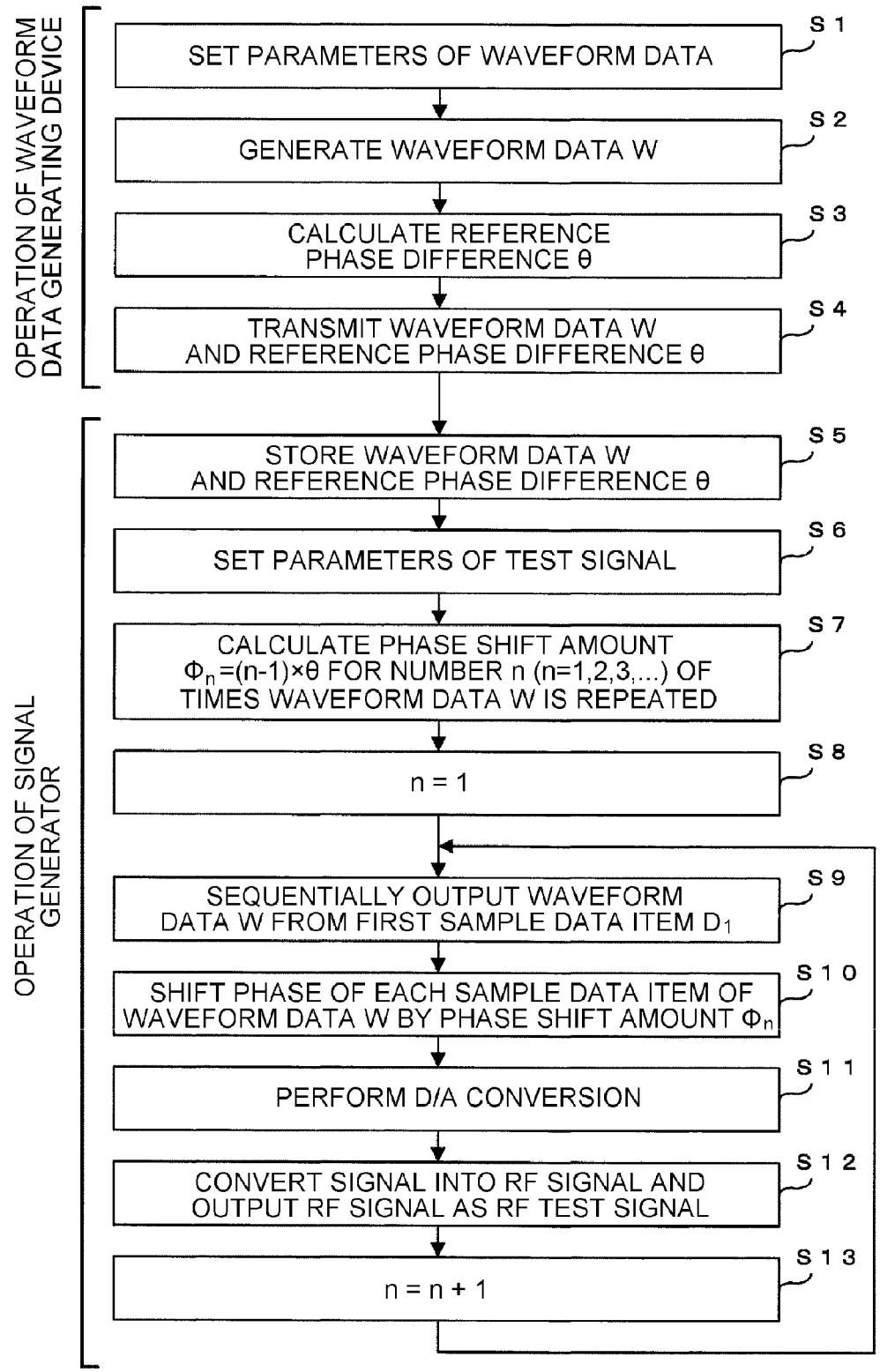
FIG. 5 is a flowchart illustrating the first embodiment of the invention.

Next, the operation of the signal generating system 100 according to this embodiment will be described with reference to the flowchart shown in FIG. 5. First, the operation of the waveform data generating device 90 will be described. The user operates the operation means 91 to set the parameters for generating the waveform data W (S1). The parameters include, for example, the content of data before modulation and a data length. The waveform data generating means 92 generates the waveform data W on the basis of the set parameters (S2). The reference phase difference determining means 93 determines the reference phase difference θ using the information of the waveform data W (S3). The waveform data transmitting means 94 transmits the generated waveform data W and the determined reference phase difference θ to the signal generator 10 (S4).

Next, the operation of the signal generator 10 will be described. The waveform data storage means 20 stores the waveform data W and the reference phase difference θ received from the waveform data generating device 90 (S5). The user operates the operation unit (not shown) to set parameters for outputting the RF test signal (S6). The parameters include, for example, the selection of plural kinds of waveform data W stored in the waveform data storage means 20, the carrier frequency of the RF test signal, an output level, and an output relay time (or the number of times the waveform data is repeatedly output and relayed). The phase shift amount calculating means 33 receives the reference phase difference θ from the waveform data storage means 20 and calculates the phase shift amount $\phi_n$ for the number n (n=1, 2, 3, . . . ) of times the waveform data W is output (S7). The phase shift amount $\phi_n$ may be calculated for all of the predetermined numbers n using the output relay time or the number of times the waveform data is repeatedly output and relayed which is set as the parameter. Alternatively, whenever the waveform data W is repeatedly output, the phase shift amount $\phi_n$ may be calculated for the number of times n the waveform data W is repeatedly output.

The number of times n the waveform data W is repeatedly output is set to 1 (S8) and the waveform data W from the waveform data storage means 20 is sequentially output from the first sample data $D_1$ to the last sample data $D_M$ (S9). The multipliers 31 and 32 multiply each of the sample data items $D_1$ to $D_M$ of the output waveform data W by phase shift data and the phase of each of the sample data items $D_1$ to $D_M$ is shifted by the phase shift amount $\phi_n$ (S10). The phase shift amount $\phi_n$ varies depending on the number of times n the waveform data W is repeatedly output.

The D/A converters 41 and 42 perform D/A conversion on each of the phase-shifted sample data items (S11), the quadrature modulation means 50 performs quadrature modulation on each of the phase-shifted sample data items, and the frequency conversion means 60 performs frequency conversion on each of the phase-shifted sample data items to generate an RF signal and outputs the generated RF signal as the RF test signal (S12). Then, the number of times n the waveform data W is repeatedly output increases (S13) and the next repeated waveform data W is output from the waveform data storage means 20. In this way, the operation of Steps S9 to S13 is repeated until the number of times n the waveform data W is repeatedly output reaches a predetermined value.

Next, the method of determining the reference phase difference θ will be described in detail. First, the concept of the method will be described with reference to FIG. 6 and four examples will be described with reference to FIGS. 7 to 10 corresponding to the examples.

Figure 6:
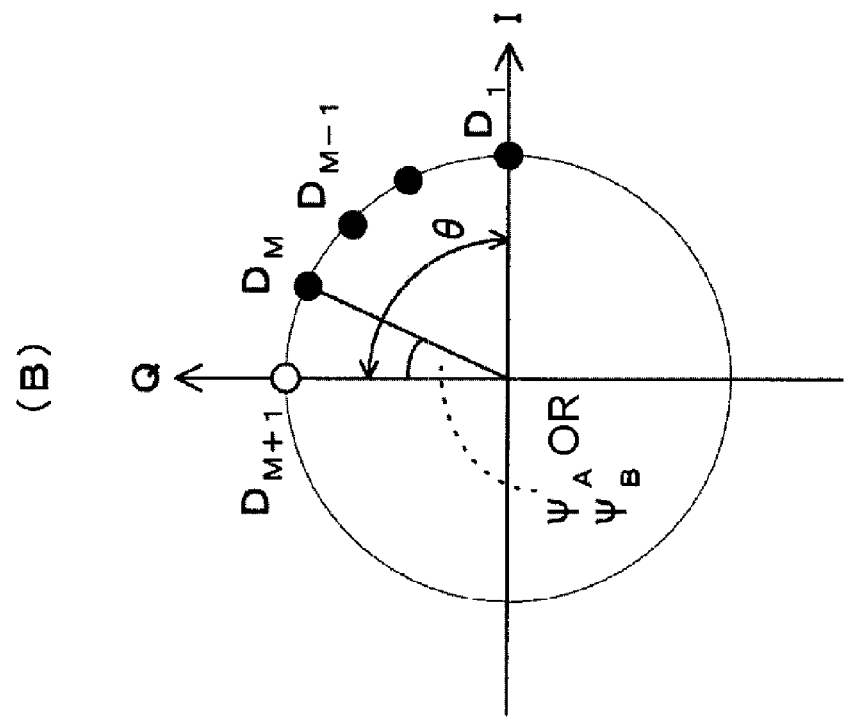
FIG. 6 is a conceptual diagram illustrating a method of determining a reference phase difference $\theta$ according to the invention.
Figure 6:
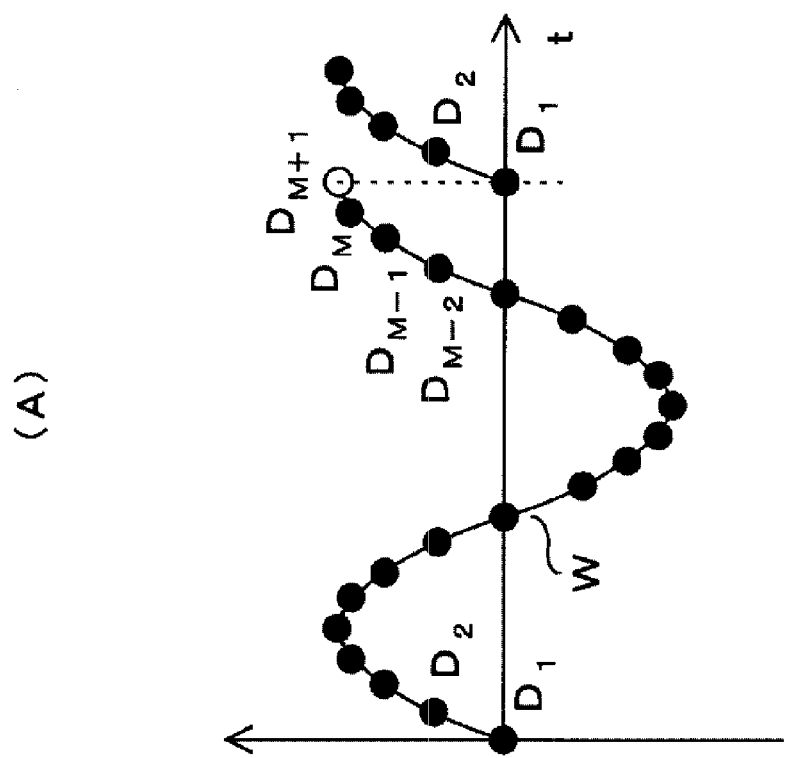
Figure 7:
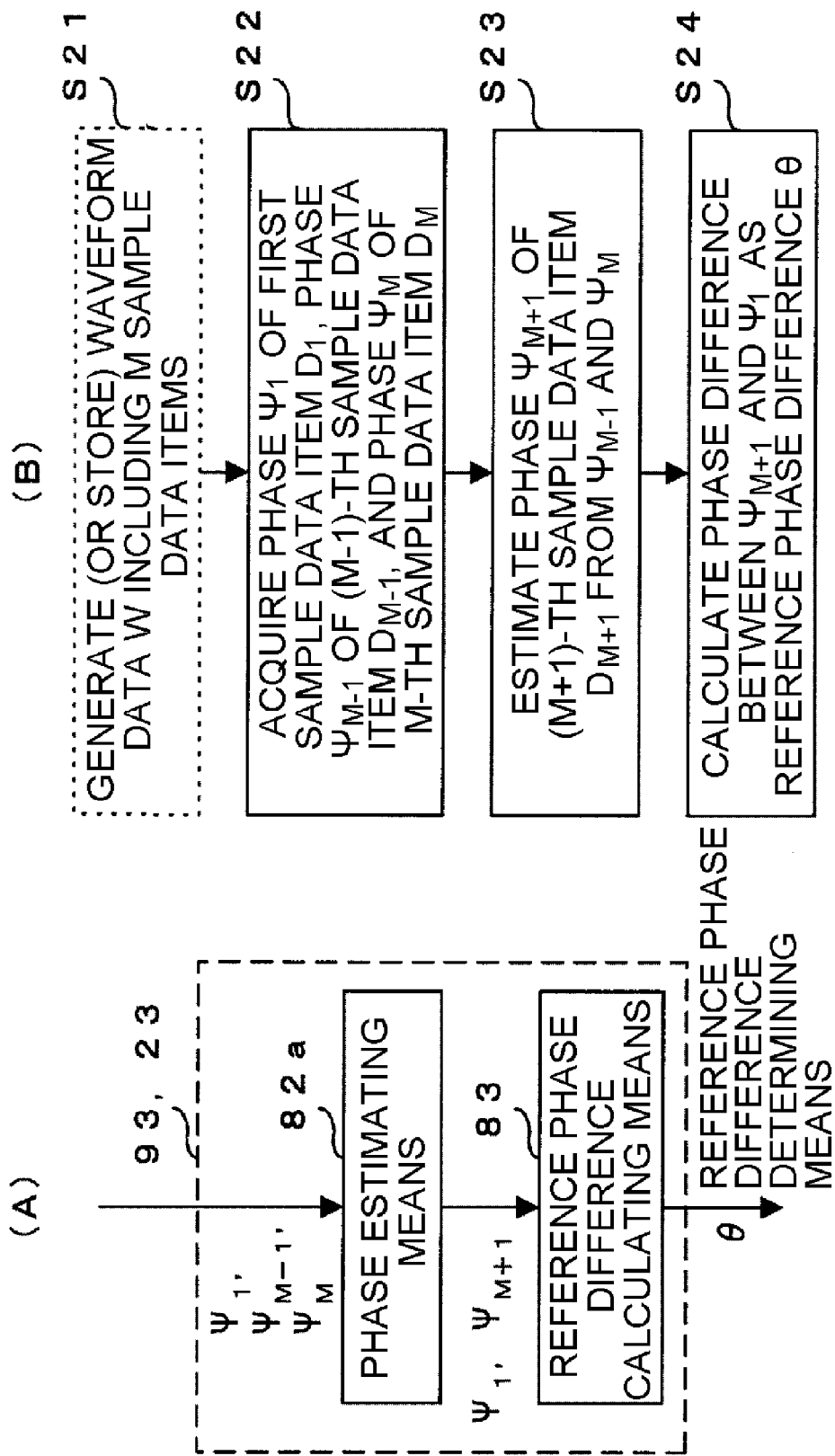
FIG. 7 is a diagram illustrating a first example of reference phase difference determining means according to the invention.
Figure 8:
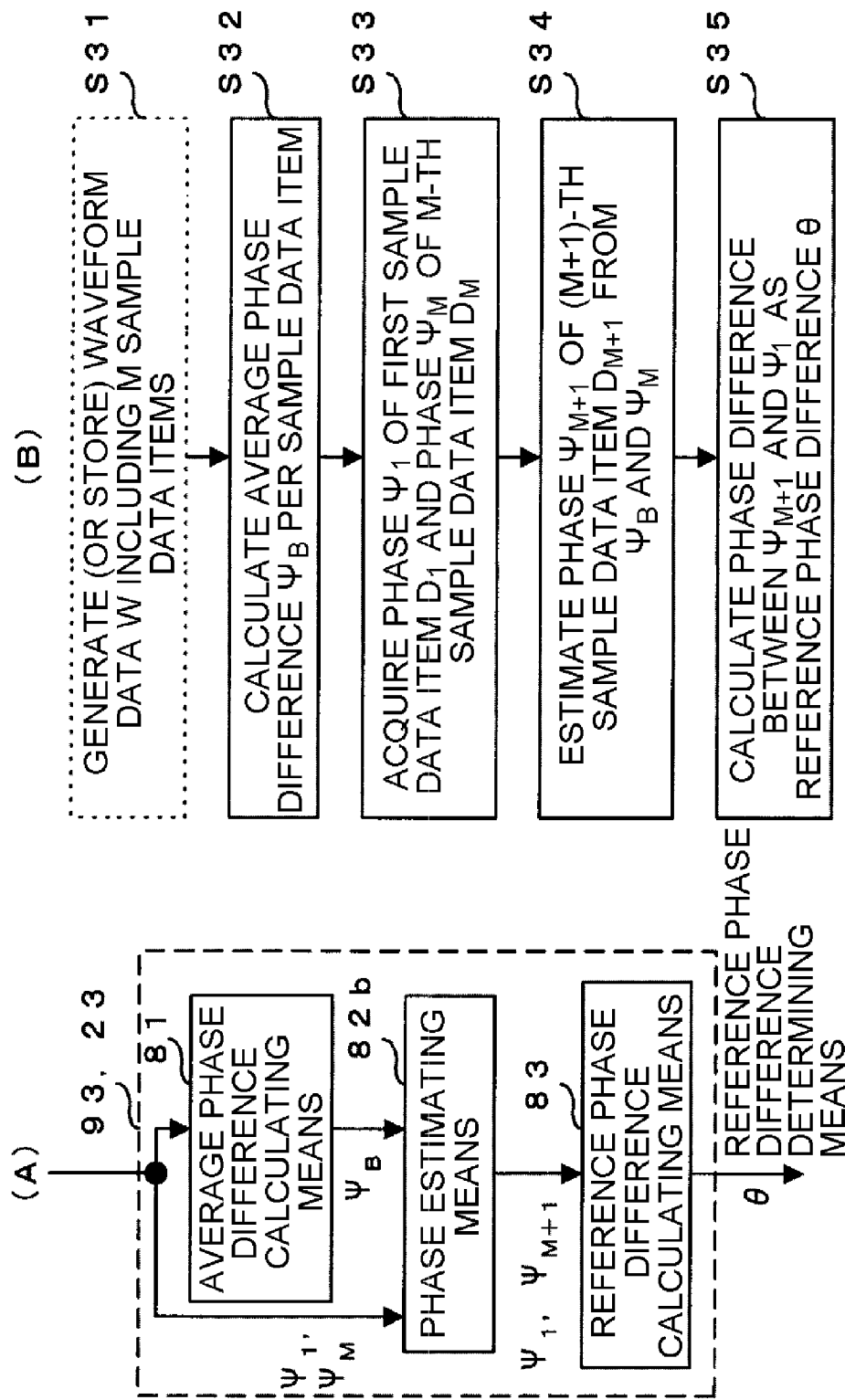
FIG. 8 is a diagram illustrating a second example of the reference phase difference determining means according to the invention.
Figure 9:
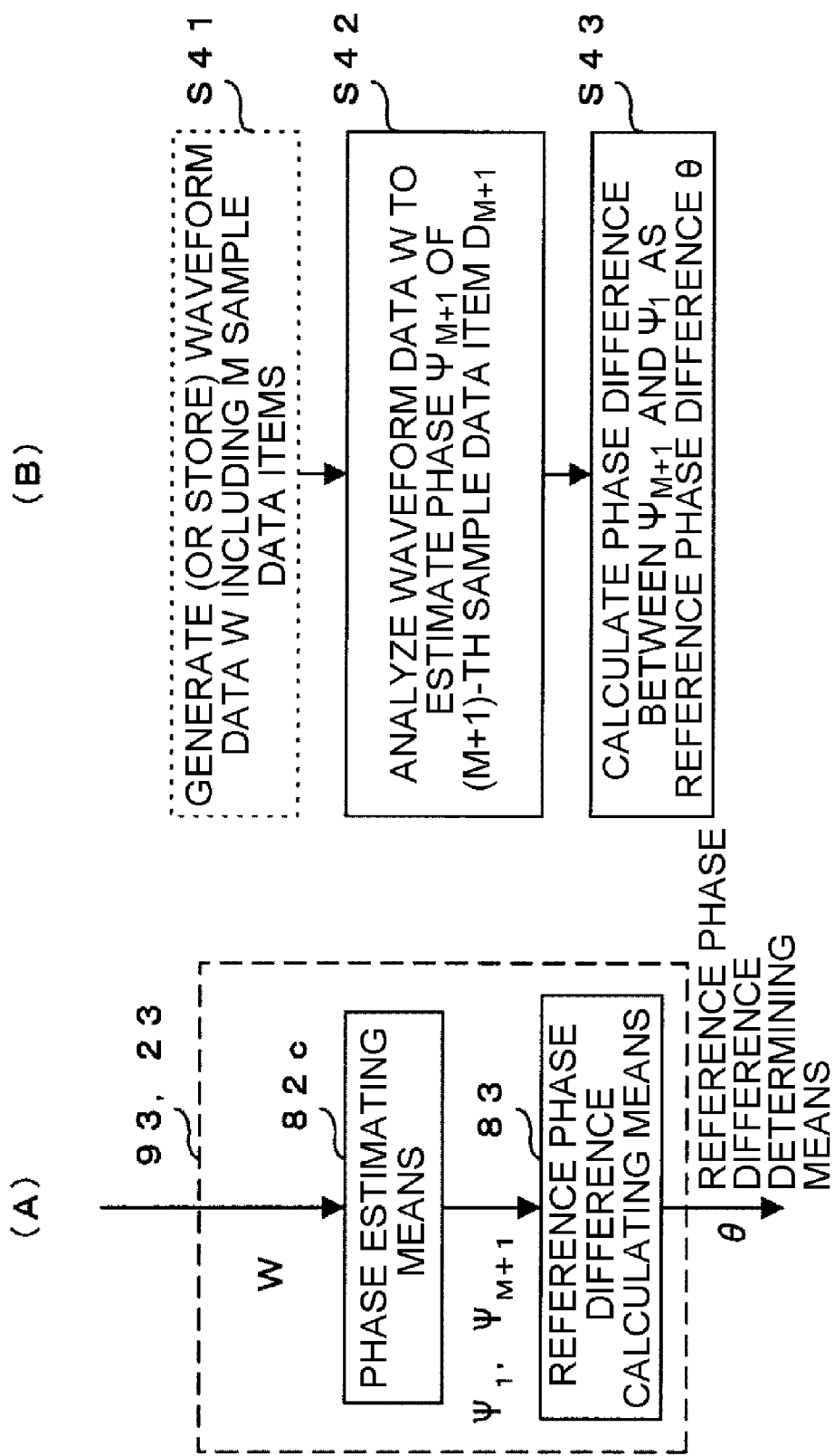
FIG. 9 is a diagram illustrating a third example of the reference phase difference determining means according to the invention.
Figure 10:
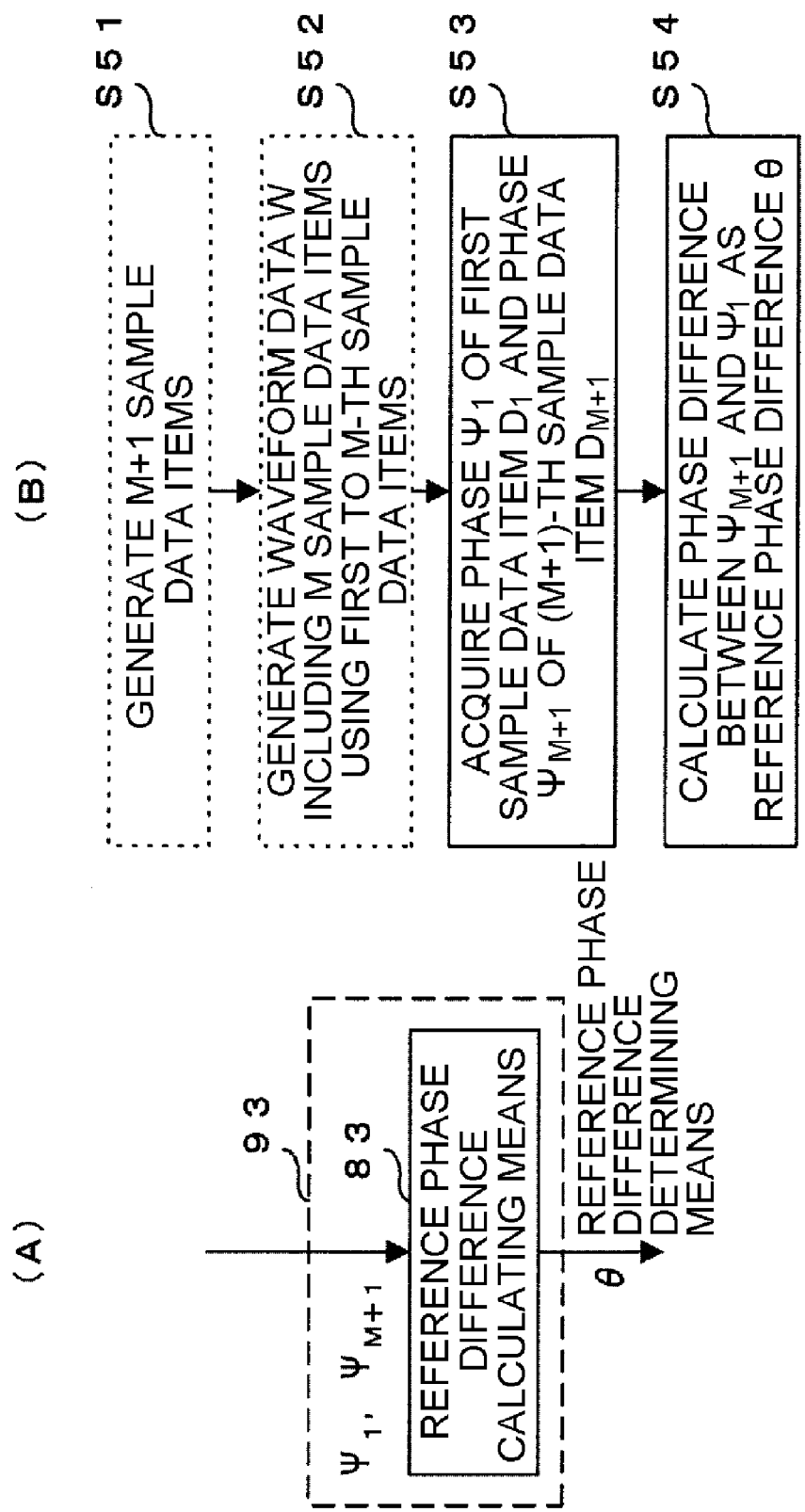
FIG. 10 is a diagram illustrating a fourth example of the reference phase difference determining means according to the invention.

FIG. 6 is a diagram illustrating the concept of the method of determining the reference phase difference θ. Specifically, FIG. 6(A) schematically shows the sample data items arranged along the time axis and FIG. 6(B) shows the sample data items on an IQ plane. As shown in FIG. 6(A), in order to make the phase of the first repeated waveform data W continuous with the phase of the second repeated waveform data W, when attention is focused on the first sample data $D_1$ of the second repeated waveform data, the phase of the second repeated waveform data may be shifted such that the phase of the sample data item $D_1$ is the same as the phase of a sample data item $D_{M+1}$ of the first repeated waveform data. As shown in FIG. 6(B), the phase difference between the sample data items $D_1$ and $D_{M+1}$ is θ and becomes the reference phase difference θ. As another representation, the reference phase difference θ is the difference between the phase of the first sample data item $D_1$ of the waveform data W and the phase of the sample data item $D_{M+1}$ which is subsequent to the last sample data item $D_M$.

However, the sample data item $D_{M+1}$ does not originally exist. Therefore, in order to determine the reference phase difference θ, a method is performed which obtains the phase of the sample data item $D_{M+1}$ and determines the reference phase difference θ on the basis of the obtained phase. In the following examples, the method will be described in detail.

The first and second examples relate to a method of adding a predetermined phase ($\Psi_A$ or $\Psi_B$) to the phase of the last sample data item $D_M$ to obtain the phase of the sample data item $D_{M+1}$. The third example relates to a method of analyzing the waveform data W to estimate the phase of the sample data item $D_{M+1}$. The fourth example relates to a method of directly obtaining the phase of the sample data item $D_{M+1}$.

First Example

FIG. 7(A) is a block diagram illustrating the structure of reference phase difference determining means 93 (or reference phase difference determining means 23 which will be described below) according to the first example. The reference phase difference determining means 93 includes phase estimating means 82a and reference phase difference calculating means 83. FIG. 7(B) is a flowchart illustrating a method of determining the reference phase difference θ in correspondence with FIG. 7(A).

First, the waveform data generating means 92 generates the waveform data W including M sample data items $D_1$ to $D_M$ (S21). The phase estimating means 82a acquires information of three phases, that is, the phase $\Psi_1$ of the first sample data item $D_1$, the phase $\Psi_{M-1}$ of an (M−1)-th sample data item $D_{M-1}$, and the phase $\Psi_M$ of an M-th sample data item $D_M$ in the waveform data W from the waveform data generating means 92 (S22). The phase estimating means 82a calculates $\Psi_{M+1}=\Psi_M+\Psi_A=\Psi_M+(\Psi_M-\Psi_{M-1})$ (where $\Psi_A$ is the difference between the phase $\Psi_M$ of the M-th sample data item $D_M$ and the phase $\Psi_{M-1}$ of the (M−1)-th sample data item $D_{M-1}$) to estimate the phase $\Psi_{M+1}$ of an (M+1)-th sample data item $D_{M+1}$ (S23). The reference phase difference calculating means 83 calculates θ=$\Psi_{M+1}-\Psi_1$ from the phase $\Psi_1$ of the sample data item $D_1$ and the estimated phase $\Psi_{M+1}$ of the sample data item $D_{M+1}$, thereby calculating the reference phase difference θ (S24). In this way, the reference phase difference θ is determined.

According to this example, the reference phase difference θ is determined by simple calculation from the information of the phases of three sample data items in the generated waveform data W. Therefore, it is possible to determine the reference phase difference θ with ease. In addition, it is possible to determine the reference phase difference θ later even for the waveform data which is generated by the waveform data generating device according to the related art and in which the reference phase difference θ is not determined. The signal generator according to the invention can output the waveform data such that the phases of the head and tail of the waveform are continuous.

Second Example

FIG. 8(A) is a block diagram illustrating the structure of reference phase difference determining means 93 (or reference phase difference determining means 23 which will be described below) according to a second example. The reference phase difference determining means 93 includes average phase difference calculating means 81, phase estimating means 82b, and reference phase difference calculating means 83. FIG. 8(B) is a flowchart illustrating a method of determining the reference phase difference θ in correspondence with FIG. 8(A).

First, the waveform data generating means 92 generates waveform data W including M sample data items $D_1$ to $D_M$ (S31). The average phase difference calculating means 81 receives the phase information of the sample data items $D_1$ to $D_M$ from the waveform data generating means 92 and calculates an average phase difference $\Psi_B$ per sample data item, which is the average value of the phase difference between a given sample data item $D_m$ and the next sample data item $D_{m+1}$ (S32). The phase estimating means 82b acquires the information of the phase $\Psi_1$ of the first sample data item $D_1$ and the phase $\Psi_M$ of an M-th sample data item $D_M$ in the waveform data W (S33). Then, the phase estimating means 82b calculates $\Psi_{M+1} = \Psi_m + \Psi_B$ to estimate the phase $\Psi_{M+1}$ of an (M+1)-th sample data item $D_{M+1}$ (S34). The reference phase difference calculating means 83 calculates $\theta = \Psi_{M+1} - \Psi_1$ from the phase $\Psi_1$ of the sample data item $D_1$ and the estimated phase $\Psi_{M+1}$ of the sample data item $D_{M+1}$, thereby calculating the reference phase difference $\theta$ (S35). In this way, the reference phase difference $\theta$ is determined.

According to this example, the reference phase difference $\theta$ is determined from the phase information of the sample data items in the generated waveform data W. Therefore, it is possible to determine the reference phase difference $\theta$ later even for the waveform data which is generated by the waveform data generating device according to the related art and in which the reference phase difference $\theta$ is not determined. The signal generator according to the invention can output the waveform data such that the phases of the head and tail of the waveform are continuous.

Third Example

FIG. 9(A) is a block diagram illustrating the structure of reference phase difference determining means 93 (or reference phase difference determining means 23 which will be described below) according to a third example. The reference phase difference determining means 93 includes phase estimating means 82c, and reference phase difference calculating means 83. FIG. 9(B) is a flowchart illustrating a method of determining the reference phase difference $\theta$ in correspondence with FIG. 9(A).

First, the waveform data generating means 92 generates waveform data W including M sample data items $D_1$ to $D_M$ (S41). The phase estimating means 82c receives the waveform data W from the waveform data generating means 92, analyzes the waveform data W, and estimates the phase $\Psi_{M+1}$ of an (M+1)-th sample data item $D_{M+1}$ (S42). The reference phase difference calculating means 83 calculates $\theta = \Psi_{M+1} - \Psi_1$ from the phase $\Psi_1$ of the sample data item $D_1$ and the estimated phase $\Psi_{M+1}$ of the sample data item $D_{M+1}$, thereby calculating the reference phase difference $\theta$ (S43). In this way, the reference phase difference $\theta$ is determined.

Examples of a method of analyzing the waveform data W in the phase estimating means 82c will be described below.

(a) The frequency of the vicinity of the first data item and the frequency of the vicinity of the last data item in the waveform data W are analyzed. As a result, when the frequencies are substantially equal to each other, the phase is changed at a constant rate during the period from the vicinity of the last data item to the vicinity of the first data item in the next repeated waveform data W for which the frequency is hardly changed. Therefore, it is possible to estimate the phase $\Psi_{M+1}$ with ease.

(b) A variation in the frequency of the waveform data W over time is analyzed. As a result, for example, when there is a signal which is alternately changed at frequencies of 1 kHz and 2 kHz over time, the signal may be estimated to an FSK-modulated signal. Since the phase of the FSK-modulated signal is changed at a constant rate during the period for which the frequency of the FSK-modulated signal is not changed, it is possible to estimate the phase $\Psi_{M+1}$ with ease.

(c) A variation in the phase of the waveform data W over time is analyzed. As a result, for example, since the phase of a signal with a phase which is proportional to time (linear function with respect to time) is changed at a constant rate, it is possible to estimate the phase $\Psi_{M+1}$ with ease. In addition, the method may be combined with a method of performing an FFT process on the waveform data W to analyze a frequency. In this case, it is possible to accurately guess the waveform data W and estimate the phase $\Psi_{M+1}$.

(d) A variation in the amplitude of the waveform data W over time is analyzed. An approximate expression is calculated according to the analysis result and the phase $\Psi_{M+1}$ is calculated from the approximate expression.

The phase estimating means 82b estimates the phase $\Psi_{M+1}$ using any one of the methods (a) to (d) or combinations thereof.

According to this example, the generated waveform data W is analyzed to determine the reference phase difference $\theta$. Therefore, it is possible to determine the reference phase difference $\theta$ later even for the waveform data which is generated by the waveform data generating device according to the related art and in which the reference phase difference $\theta$ is not determined. The signal generator according to the invention can output the waveform data such that the phases of the head and tail of the waveform are continuous.

Fourth Example

FIG. 10(A) is a block diagram illustrating the structure of reference phase difference determining means 93 according to a fourth example. The reference phase difference determining means 93 includes reference phase difference calculating means 83. FIG. 10(B) is a flowchart illustrating a method of determining the reference phase difference $\theta$ in correspondence with FIG. 10(A).

First, the waveform data generating means 92 generates M sample data items $D_1$ to $D_M$ and at least the phase information of a sample data item $D_{M+1}$ (the waveform data generating means 92 may generate all of M+1 sample data items $D_1$ to $D_{M+1}$) (S51) and generates waveform data W including the M sample data items $D_1$ to $D_M$ (S52). The reference phase difference calculating means 83 acquires the information of the phase $\Psi_1$ of the sample data item $D_1$ and the phase $\Psi_{M+1}$ of the sample data item $D_{M+1}$ from the waveform data generating means 92 (S53) and calculates $\theta = \Psi_{M+1} - \Psi_1$, thereby calculating the reference phase difference $\theta$ (S54). In this way, the reference phase difference $\theta$ is determined.

According to this example, when the waveform data W including the M sample data items is generated, the phase information of the (M+1)-th sample data item $D_{M+1}$ which is not originally generated is generated and acquired and the reference phase difference $\theta$ is determined from the phase information. Since the phase $\Psi_{M+1}$ of the (M+1)-th sample data item $D_{M+1}$ is not calculated by estimation, but is actually generated and acquired, it is possible to accurately determine the reference phase difference $\theta$. The signal generator according to the invention can output the waveform data such that the phases of the head and tail of the waveform are continuous.

Second Embodiment

Figure 11:
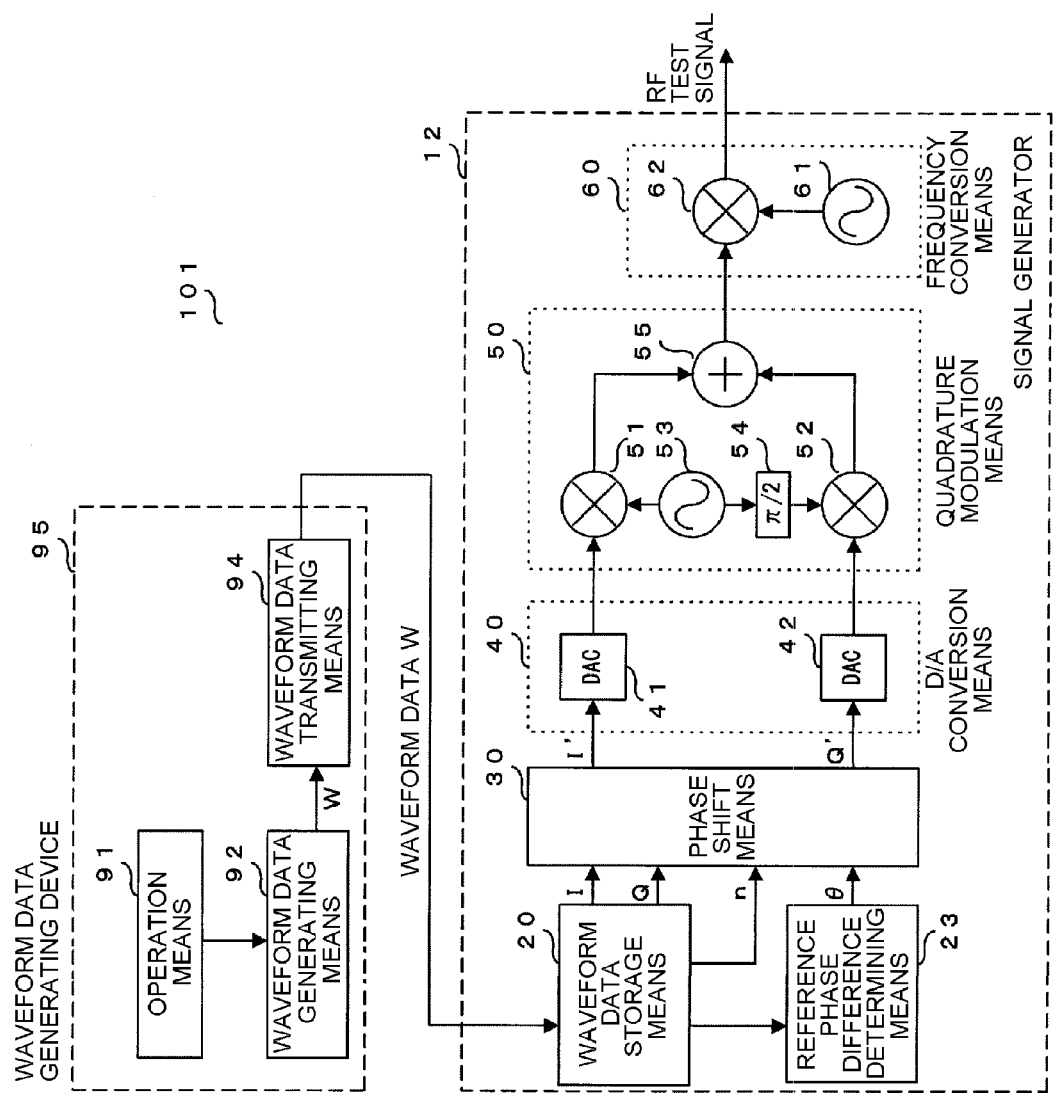
FIG. 11 is a block diagram illustrating a second embodiment of the invention.

FIG. 11 shows the structure of a signal generating system 101 according to a second embodiment of the invention. The signal generating system 101 includes a waveform data generating device 95 that generates waveform data W and a signal generator 12 that generates an RF test signal on the basis of the waveform data W. Next, the difference between the second embodiment and the first embodiment will be mainly described and a description of components having the same structure as those in the first embodiment will be appropriately omitted.

The waveform data generating device 95 differs from the waveform data generating device 90 according to the first embodiment in that the reference phase difference determining means 93 is not provided. Therefore, the waveform data generating device 95 does not generate a reference phase difference θ and the information of the reference phase difference θ is not transmitted from the waveform data generating device 95 to the signal generator 12.

The signal generator 12 differs from the signal generator 10 according to the first embodiment in that it includes reference phase difference determining means 23. The reference phase difference determining means 23 has the structure of any one of the first example, the second example, and the third example of the first embodiment. The reference phase difference determining means 23 is implemented by an arithmetic process of an arithmetic circuit (FPGA or DSP) or a CPU. The signal generator 12 may include frequency conversion means 70 having the functions of quadrature modulation means 50 and frequency conversion means 60, similarly to the signal generator 11 shown in FIG. 4.

Figure 12:
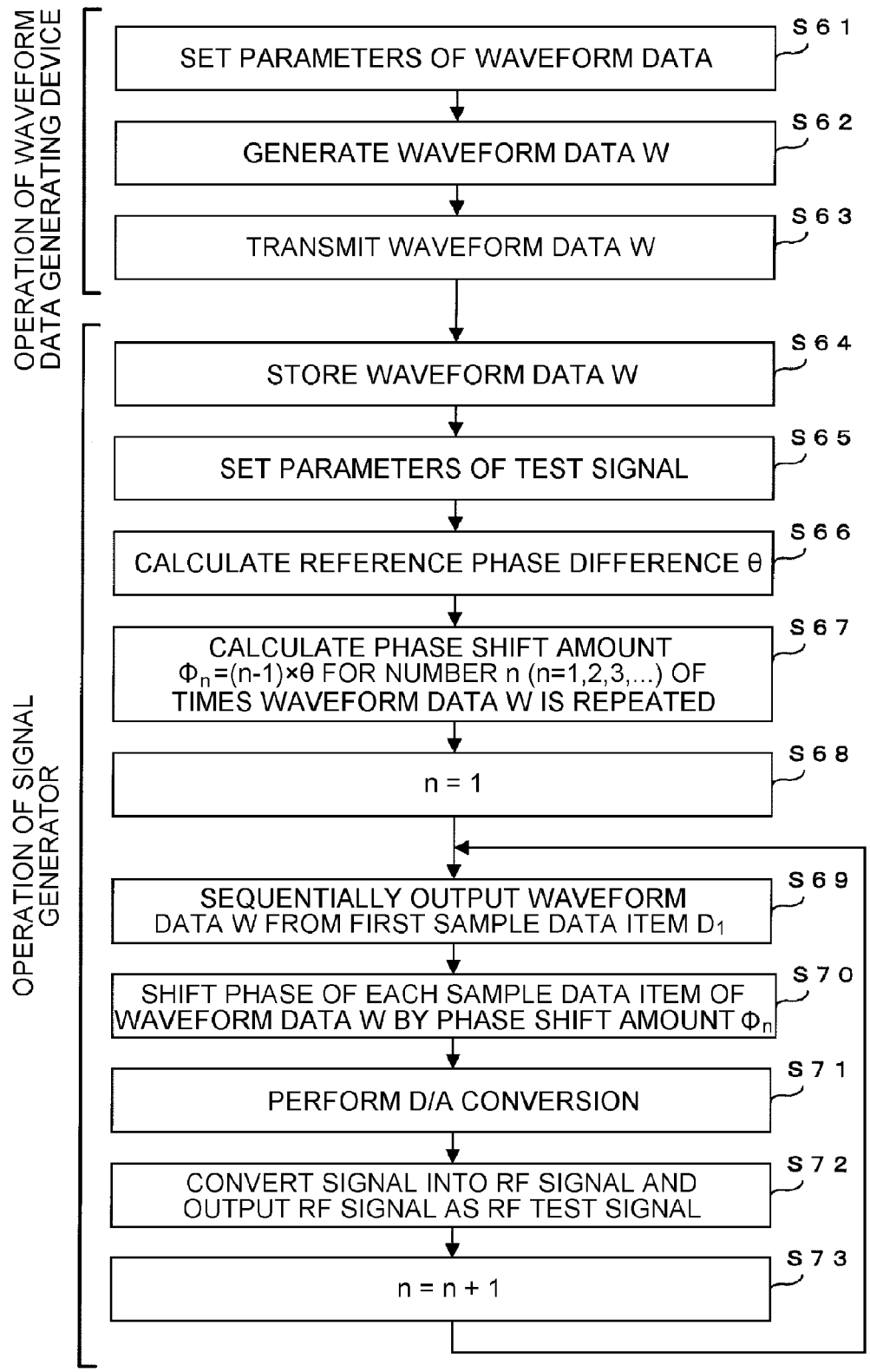
FIG. 12 is a flowchart illustrating the second embodiment.
Figure 13:
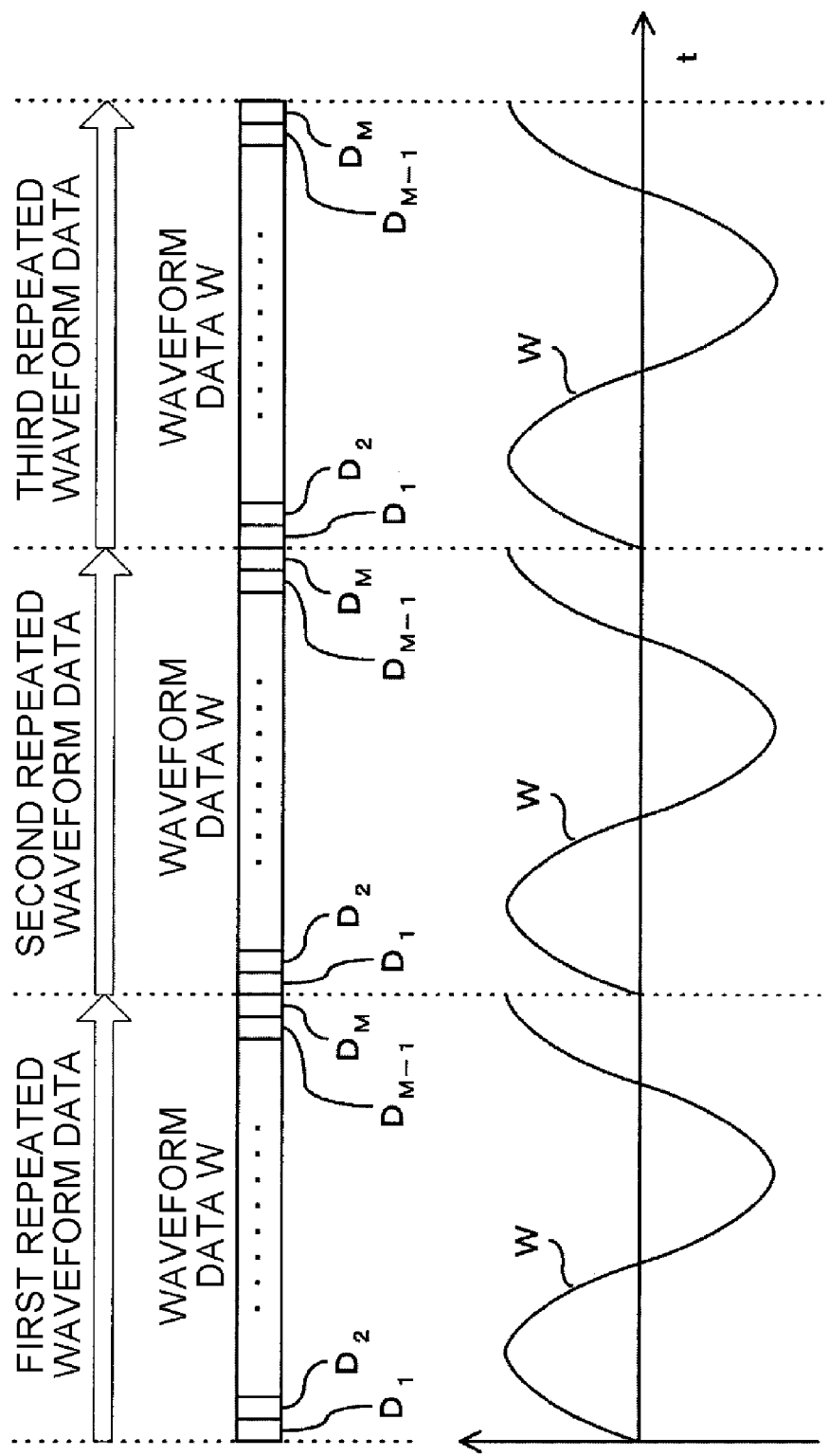
FIG. 13 is a conceptual diagram illustrating the output of waveform data from a signal generator according to the related art.

FIG. 12 is a flowchart illustrating the operation of the signal generating system 101 according to this embodiment. The second embodiment differs from the first embodiment in that there is no step of calculating the reference phase difference θ in the operation of the waveform data generating device from Step S61 to Step S63. In addition, the second embodiment differs from the first embodiment in that there is a step (S66) of calculating the reference phase difference θ in the operation of the signal generator from Step S64 to Step S73. As described above, the step in any one of the first example, the second example, and the third example of the first embodiment may be used as the step of calculating the reference phase difference θ. The reference phase difference θ may be calculated in any step after the waveform data W is stored and before the phase shift amount $\phi_n$ is calculated.

INDUSTRIAL APPLICABILITY

As such, the signal generator, the signal generating system, and the signal generating method according to the invention can repeatedly generate an arbitrary waveform such that the phases of the head and tail of the generated waveform are continuous. Therefore, they are useful for accurately testing a wireless communication device.

DESCRIPTION OF REFERENCE NUMERALS AND SIGNS 10, 11, 12: SIGNAL GENERATOR
20: WAVEFORM DATA STORAGE MEANS
23: REFERENCE PHASE DIFFERENCE DETERMINING MEANS
30: PHASE SHIFT MEANS
31, 32: MULTIPLIER
33: PHASE SHIFT AMOUNT CALCULATING MEANS
40: D/A CONVERSION MEANS
41, 42: D/A CONVERTER
50: QUADRATURE MODULATION MEANS
51, 52: MIXER
53: LOCAL OSCILLATOR
54: 90-DEGREE PHASE SHIFTER
55: ADDER
60: FREQUENCY CONVERSION MEANS
61: LOCAL OSCILLATOR
62: MIXER
70: FREQUENCY CONVERSION MEANS
73: LOCAL OSCILLATOR
81: AVERAGE PHASE DIFFERENCE CALCULATING MEANS
82: PHASE ESTIMATING MEANS
83: REFERENCE PHASE DIFFERENCE CALCULATING MEANS
90: WAVEFORM DATA GENERATING DEVICE
91: OPERATION MEANS
92: WAVEFORM DATA GENERATING MEANS
93: REFERENCE PHASE DIFFERENCE DETERMINING MEANS
94: WAVEFORM DATA TRANSMITTING MEANS
95: WAVEFORM DATA GENERATING DEVICE
100, 101: SIGNAL GENERATING SYSTEM

The invention claimed is:

1. A signal generator for testing a wireless communication device comprising:
waveform data storage means for storing waveform data of a digital baseband signal including M sample data items and repeatedly and continuously outputting the waveform data;
digital-to-analog conversion means for performing digital-analog conversion on the waveform data;
frequency conversion means for performing frequency conversion on the digital-analog-converted baseband signal using a carrier signal with a predetermined frequency and outputting the frequency-converted signal as an RF test signal for testing the wireless communication device; and
phase shift means that receives the waveform data which is repeatedly output n times from the waveform data storage means, shifts the phase of each sample data item in an n-th waveform data item by a phase shift amount $\phi_n$ corresponding to the number of times n the waveform data is repeatedly output, and outputs the waveform data to the digital-to-analog conversion means,
wherein the phase shift amount $\phi_n$ is calculated from a reference phase difference θ, which is a phase difference between an (n−1)-th waveform data item and the n-th waveform data item, and the number of times n the waveform data is repeatedly output in order to obtain a continuous phase change between the tail of the (n−1)-th waveform data item and the head of the n-th waveform data item, and
wherein the sample data items of the waveform data are a complex I-phase sample data item and a complex Q-phase sample data item, and
the phase shift means includes:
phase shift amount calculating means for obtaining the phase shift amount $\phi_n$ from the reference phase difference θ and the number n of times the waveform data is repeatedly output, and outputting a first phase shift data item represented by cos $\phi_n$ and a second phase shift data item represented by sin $\phi_n$;
a first multiplier which multiplies the first phase shift data item by the I-phase sample data item output from the waveform data storage means and outputs;
a second multiplier which multiplies the first phase shift data item by the Q-phase sample data item output from the waveform data storage means and outputs;
a third multiplier which multiplies the second phase shift data item by the Q-phase sample data item output from the waveform data storage means and outputs;

a fourth multiplier which multiplies the second phase shift data item by the I-phase sample data item output from the waveform data storage means and outputs;

a first calculator which subtracts the output of the third multiplier from the output of the first multiplier and outputs to the digital-to-analog conversion means; and a second calculator which adds the output of the second multiplier and the output of the fourth multiplier and outputs to the digital-to-analog conversion means.

2. The signal generator according to claim 1, further comprising:

reference phase difference determining means for determining the reference phase difference θ on the basis of the waveform data stored in the waveform data storage means.

3. The signal generator according to claim 2, wherein the reference phase difference determining means includes:

phase estimating means for estimating the phase of an (M+1)-th sample data item on the basis of the phase of an M-th sample data item and the phase of an (M−1)-th sample data item from the head of the waveform data; and reference phase difference calculating means for calculating the reference phase difference θ from a difference between the phase of a first sample data item and the phase of the (M+1)-th sample data item in the waveform data.

4. The signal generator according to claim 2, wherein the reference phase difference determining means includes:

average phase difference calculating means for calculating an average phase difference per sample data item of the waveform data;

phase estimating means for estimating the phase of an (M+1)-th sample data item on the basis of the phase of an M-th sample data item from the head of the waveform data and the average phase difference; and reference phase difference calculating means for calculating the reference phase difference θ from a difference between the phase of a first sample data item and the phase of the (M+1)-th sample data item in the waveform data.

5. A signal generating system comprising:

the signal generator according to claim 1; and a waveform data generating device that generates the waveform data and transmits the waveform data to the signal generator, wherein the waveform data generating device includes:

waveform data generating means for generating the waveform data;

reference phase difference determining means for determining the reference phase difference θ; and waveform data transmitting means for transmitting the waveform data and the reference phase difference θ to the signal generator.

6. The signal generating system according to claim 5, wherein the reference phase difference determining means includes:

phase estimating means for estimating the phase of an (M+1)-th sample data item on the basis of the phase of an M-th sample data item and the phase of an (M−1)-th sample data item from the head of the waveform data; and reference phase difference calculating means for calculating the reference phase difference θ from a difference between the phase of a first sample data item and the phase of the (M+1)-th sample data item in the waveform data.

7. The signal generating system according to claim 5, wherein the reference phase difference determining means includes:

average phase difference calculating means for calculating an average phase difference per sample data item of the waveform data;

phase estimating means for estimating the phase of an (M+1)-th sample data item on the basis of the phase of an M-th sample data item from the head of the waveform data and the average phase difference; and reference phase difference calculating means for calculating the reference phase difference θ from a difference between the phase of a first sample data item and the phase of the (M+1)-th sample data item in the waveform data.

8. The signal generating system according to claim 5, wherein the waveform data generating means generates first to M-th sample data items, acquires the phase of an (M+1)-th sample data item, and generates the waveform data using the generated M sample data items, and the reference phase difference determining means includes reference phase difference calculating means for calculating the reference phase difference θ from a difference between the phase of the first sample data item and the phase of the (M+1)-th sample data item in the waveform data.

9. A signal generating method for testing a wireless communication device comprising:

a step of repeatedly and continuously outputting waveform data of a digital baseband signal including M sample data items;

a step of performing digital-analog conversion on the waveform data;

a step of performing frequency conversion on the digital-analog-converted baseband signal using a carrier signal with a predetermined frequency and outputting the frequency-converted signal as an RF test signal for testing the wireless communication device;

a step of, when the number of times the waveform data is repeatedly output is n, calculating a phase shift amount $\phi_n$ corresponding to the number of times n the waveform data is repeatedly output; and a step of shifting the phase of each sample data item in an n-th waveform data item by the phase shift amount $\phi_n$ when the waveform data which is repeatedly output n times is received before the digital-analog conversion step, wherein the phase shift amount $\phi_n$ is calculated from a reference phase difference θ, which is a phase difference between an (n−1)-th waveform data item and the n-th waveform data item, and the number of times n the waveform data is repeatedly output in order to obtain a continuous phase change between the tail of the (n−1)-th waveform data item and the head of the n-th waveform data item, and wherein the sample data items of the waveform data are a complex I-phase sample data item and a complex Q-phase sample data item, and the step of shifting the phase includes:

a step of obtaining the phase shift amount $\phi_n$ from the reference phase difference θ and the number n of times the waveform data is repeatedly output, and outputting a first phase shift data item represented by $\cos \phi_n$ and a second phase shift data item represented by $\sin \phi_n$;

a first multiplying step in which the first phase shift data item is multiplied by the I-phase sample data item of the waveform data output in the step of outputting the waveform data;

a second multiplying step in which the first phase shift data item is multiplied by the Q-phase sample data item of the waveform data output in the step of outputting the waveform data;

a third multiplying step in which the second phase shift data item is multiplied by the Q-phase sample data item of the waveform data output in the step of outputting the waveform data;

a fourth multiplying step in which the second phase shift data item is multiplied by the I-phase sample data item of the waveform data output in the step of outputting the waveform data;

a first calculating step in which a multiplying result of the third multiplying step is subtracted from a multiplying result of the first multiplying step; and a second calculating step in which a multiplying result of the second multiplying step is added to a multiplying result of the forth multiplying step, wherein, in the step of performing digital-to-analog conversion, calculating results of the first calculating step and the second calculating step are subjected to digital-analog conversion, respectively.

10. The signal generating method according to claim 9, further comprising:

a step of determining the reference phase difference $\theta$ on the basis of the waveform data.

11. The signal generating method according to claim 10, wherein the step of determining the reference phase difference $\theta$ includes:

a step of estimating the phase of an (M+1)-th sample data item on the basis of the phase of an M-th sample data item and the phase of an (M−1)-th sample data item from the head of the waveform data; and a step of calculating the reference phase difference $\theta$ from a difference between the phase of a first sample data item and the phase of the (M+1)-th sample data item in the waveform data.

12. The signal generating method according to claim 10, wherein the step of determining the reference phase difference $\theta$ includes:

a step of calculating an average phase difference per sample data item of the waveform data;

a step of estimating the phase of an (M+1)-th sample data item on the basis of the phase of an M-th sample data item from the head of the waveform data and the average phase difference; and a step of calculating the reference phase difference $\theta$ from a difference between the phase of a first sample data item and the phase of the (M+1)-th sample data item in the waveform data.

13. The signal generating method according to claim 9, further comprising:

a step of generating first to M-th sample data items and acquiring the phase of an (M+1)-th sample data item;

a step of generating the waveform data using the generated M sample data items; and a step of calculating the reference phase difference $\theta$ from a difference between the phase of the first sample data item and the phase of the (M+1)-th sample data item in the waveform data.

* * * * *